(No Model.)

J. HEFFTNER & R. STÖCKEL.
FISHING NET.

No. 458,456. Patented Aug. 25, 1891.

WITNESSES:
A. Schehl.
Thomas Conrad

INVENTORS
Julius Hefftner and Robert Stöckel
BY Charles Karp
ATTORNEY.

UNITED STATES PATENT OFFICE.

JULIUS HEFFTNER AND ROBERT STÖCKEL, OF NEW YORK, N. Y.

FISHING-NET.

SPECIFICATION forming part of Letters Patent No. 458,456, dated August 25, 1891.

Application filed January 21, 1891. Serial No. 378,538. (No model.)

*To all whom it may concern:*

Be it known that we, JULIUS HEFFTNER and ROBERT STÖCKEL, citizens of the United States, and residents of New York, in the county and State of New York, have invented new and useful Improvements in Fishing-Nets, of which the following is a specification.

Our invention has reference to improvements in nets for fishing and crabbing; and the invention consists of a fishing-net so constructed that it is spread out when it reaches the bottom of the water and closed when it is hauled up. The stretchers of the net are so arranged that when they are turned back they are kept close together, so that the net can be conveniently stored away. We attain these objects by the mechanism illustrated in the accompanying drawings, in which—

Figure 1:
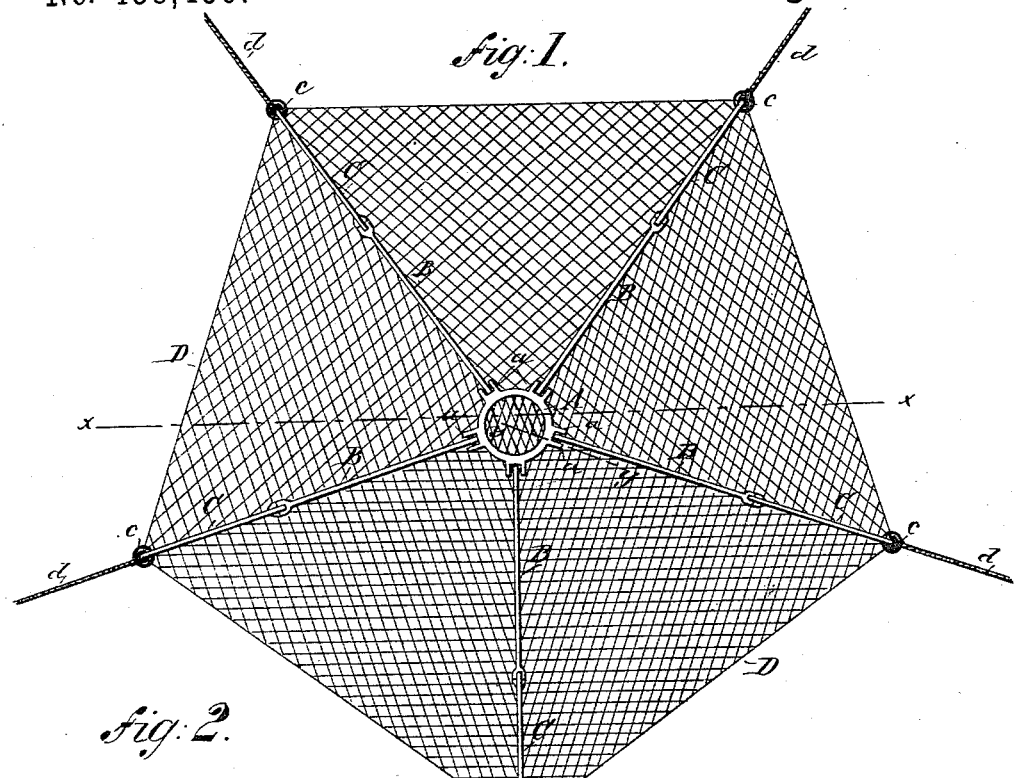
Figure 2:
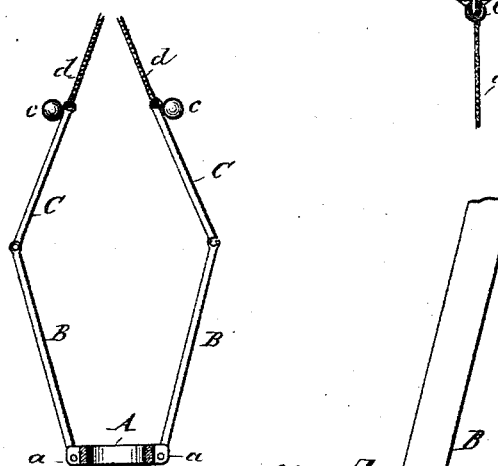
Figure 3:
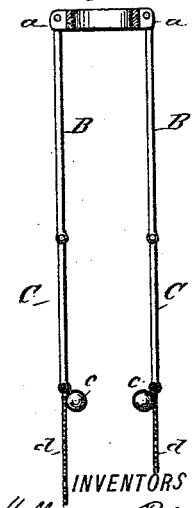
Figure 4:
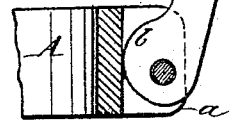

Figure 1 shows our improved fishing-net when spread out. Figs. 2 and 3 are sections on line $xx$, Fig. 1, showing the net in the positions, respectively, when hauled up and with the stretchers turned back, the web of the net being removed; and Fig. 4 is a section on line $yy$, Fig. 1, on an enlarged scale, showing the connection of a stretcher with the ring.

Similar letters of reference indicate corresponding parts.

A in the drawings represents a ring of malleable iron or any other metal, having on its outer surface a series of outwardly-extending checks $a\ a$ in certain distances from each other. Between each pair of these checks a stretcher or rib B is pivoted. The pivoted ends of the stretchers have eccentric extensions $b$, which abut against the outer surface of the ring A when the stretchers are raised, so as to form an obtuse angle with the ring, as shown in Figs. 2 and 4. To the outer ends of the stretchers arms or links C are pivoted, which are provided on their free ends with weights $c$. The web D is fastened to the ring A, the stretchers B, and the links C.

Our improved fishing-net operates in the following manner: The net is let down upon the bottom of the water by means of the strings $d$, which are fastened to the outer ends of the links or arms C. As soon as the ring A of the net has reached the bottom, the weights on the ends of the links cause the latter and the stretchers B to spread out, so that the net lies flat on the ground. Of course the strings $d$ must be let loose, as otherwise the links and stretchers could not spread apart. When the net is hauled up, the links and stretches are raised by drawing the strings $d$ up. The eccentric portions $b$ of the stretchers B abut then against the outer surface of the ring, so that the stretchers are in an obtuse angular position outwardly to the ring and the links D are in line with the pulled strings, whereby the net assumes the position of a closed bag, as shown in Fig. 2, out of which the fish or crabs caught are unable to escape. When the net is to be stored away, the stretchers are turned back in the opposite direction, so that they are in line with the outer surface of the ring A, as shown in Fig. 3. The net is thus folded together and can be conveniently carried and stored away.

The construction of our fishing-net is very simple and has the advantage that it can be very conveniently handled and assumes only a small space when stored.

We are aware that fishing-nets with stretcher-arms are well known, and we do not claim such fishing-net, broadly.

What we claim is—

1. In a fishing-net, the combination of a ring A, having a series of outwardly-extending checks $a\ a$, with linked stretchers pivoted to the said checks and having at their pivoted portions eccentric extensions $b$, which abut against the outer surface of the ring and form angles therewith when the net is hauled up, substantially as set forth.

2. In a fishing-net, the combination of a ring A, having a series of outwardly-extending checks $a\ a$, with stretchers B, provided with eccentric extensions $b$ and pivoted to the said checks, so that the said extensions abut against the outer surface of the ring, links C, pivoted to the stretchers B, and weights $c$, attached to the free ends of the links C, substantially as set forth.

Signed at New York, in the county and State of New York, this 5th day of January, 1891.

JULIUS HEFFTNER.
ROBERT STÖCKEL.

Witnesses:
CHARLES KARP,
THOMAS CONRAD.